Figure 1:
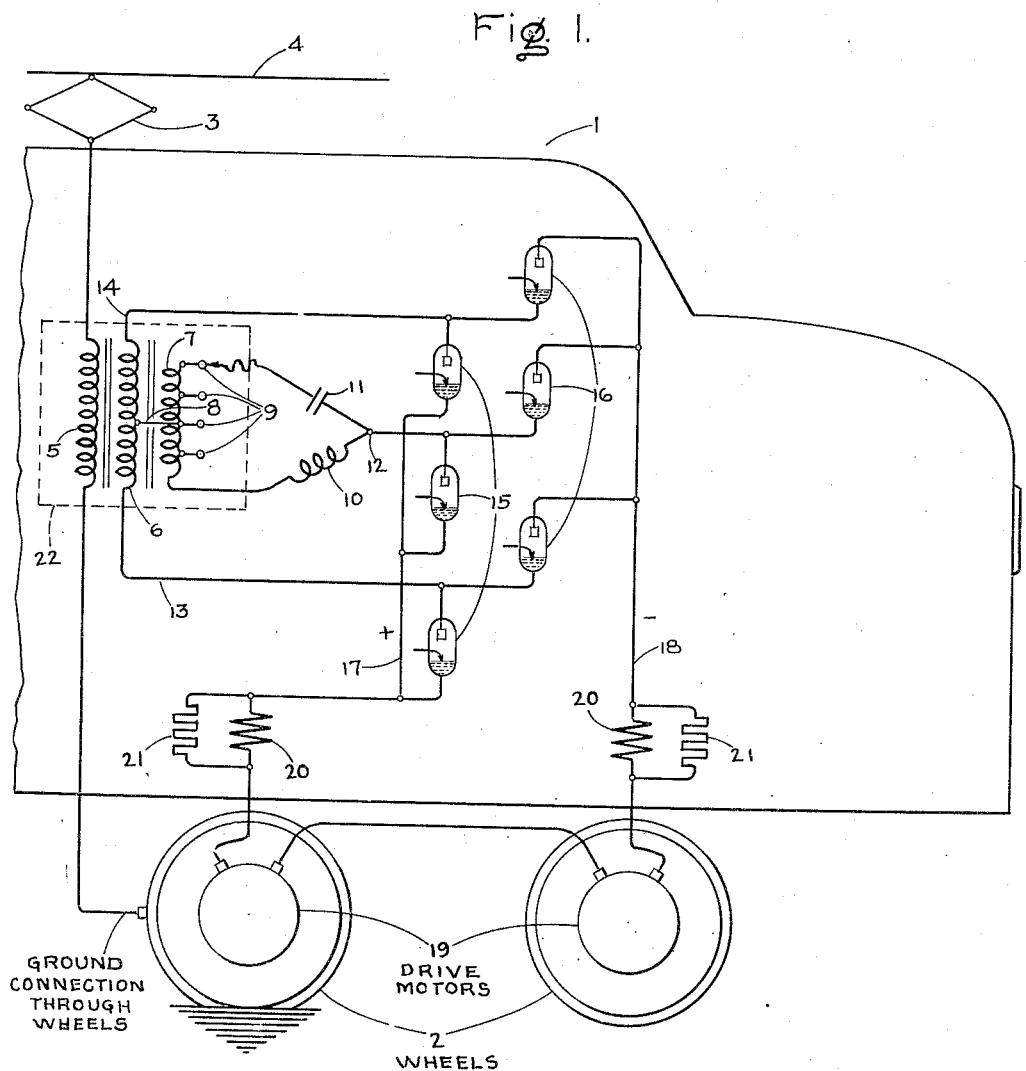

Inventors:
Ernst F. W. Alexanderson,
Burnice D. Bedford,
Albert H. Mittag,
by Ernest C. Britton
Their Attorney.

Patented Apr. 17, 1951

2,549,405

UNITED STATES PATENT OFFICE 2,549,405

LOCOMOTIVE POWER SYSTEM

Ernst F. W. Alexanderson, Schenectady, Burnice D. Bedford, Scotia, and Albert H. Mittag, Schenectady, N. Y., assignors to General Electric Company, a corporation of New York Application December 30, 1949, Serial No. 135,985

2 Claims. (Cl. 318—94)

This invention relates to a locomotive power system of the type adapted to derive energy from a single phase alternating current voltage source and, more particularly, to such a system employing rectifiers and direct current drive motors.

The advantages of trolley locomotives, which obtain electrical energy from a remote source through a trolley wire, have long been known and recognized, as distinguished from a non-trolley locomotive which burns its own fuel, for the trolley locomotive has a relatively larger source of energy which is not limited to the fuel-burning capacity which can be built into a fuel-burning locomotive. Also, in electrical transportation apparatus, the advantages of direct current drive motors have long been recognized because of the easily obtainable variable speeds of such motors. However, for long-distance trolley locomotives, alternating current is advantageous because of the ease with which voltages may be increased for long-distance power transmission and then decreased, if necessary, for utilization.

Heretofore, it has frequently been the practice to change the alternating current energy derived from the locomotive trolley into direct current energy by means of motor-generator sets, the direct current energy then being used in direct current locomotive drive motors. Non-rotating rectifiers such as gaseous discharge devices have generally not been used in railway locomotive service. One of the most important reasons has been that a simple, practical, and economical power system employing these devices has not been available.

It is, therefore, an object of this invention to provide a simple, practical, economical locomotive power system employing gaseous discharge devices.

Since one of the largest costs in a trolley locomotive system is the cost of the trolley conductor and the conductor supporting structure, the most economical trolley system is one employing only one conductor. Thus, in an alternating current trolley system, only single phase alternating current power can economically be used. In gaseous discharge power systems, however, a single phase input, if rectified directly, results in a direct current output containing large "ripples" which are very undesirable where the power is to be supplied to direct current locomotive drive motors and the excitation fields thereof. The "ripples" comprise an alternating component of current which causes eddy currents and resulting excessive heating in the magnetic structures of the motors.

It is, therefore, a further object of this invention to provide a simple, economical, practical locomotive power system for supplying direct current electrical power from a single phase alternating current source by means of gaseous discharge rectifiers wherein unevenness or "ripples" in the direct current output voltage are kept to a practical minimum.

This invention consists generally, therefore, in a locomotive power system for deriving electrical energy from a single phase alternating current trolley, shifting the phase of the voltage representing a portion of this energy by means of a monocyclic circuit to obtain two-phase alternating current energy, interconnecting the two phases to obtain a three-phase alternating current, connecting gaseous discharge devices to rectify the three-phase alternating current with a series of six pulses per cycle, and direct current drive motors connected to the gaseous discharge device output and having series excitation fields, each field having a resistor connected in parallel therewith.

Figure 2:
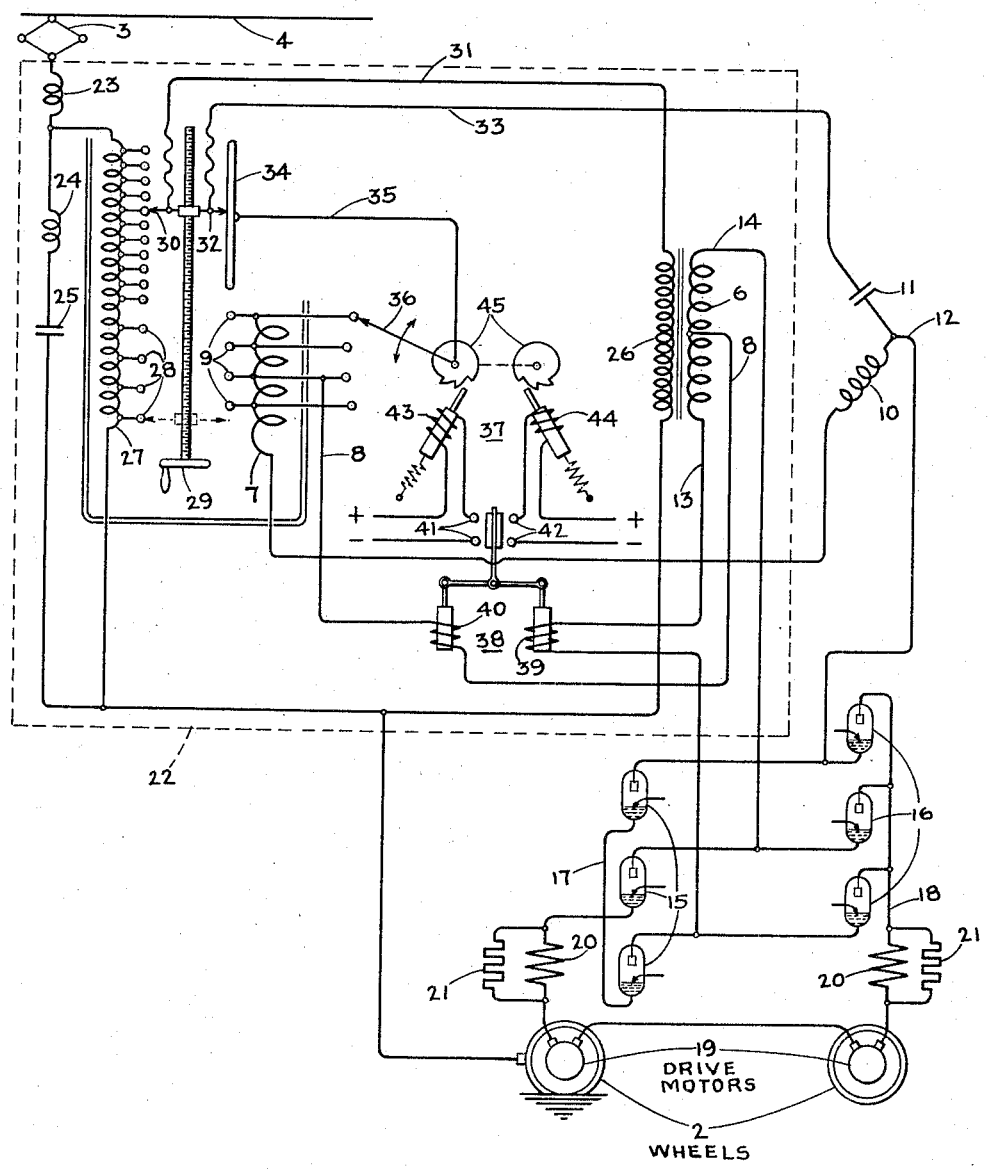

For a more complete understanding of this invention, reference should be had to the following specification and the accompanying drawings in which Fig. 1 is an illustration of a locomotive employing the power system of this invention with a simplified schematic representation of the power system shown within the locomotive outline. Fig. 2 is a complete schematic diagram of the entire power system of this invention.

Referring more particularly to Fig. 1, there is shown a locomotive 1 having driving wheels 2 and a trolley 3 in contact with a trolley wire or conductor 4. Trolley 3 is connected to a transformer primary winding 5, and the other terminal of winding 5 is connected to ground through the wheels 2. Two transformer windings 6 and 7 are shown as coupled to primary winding 5 to receive energy therefrom. These two windings 6 and 7 are interconnected at their respective center taps by a connection 8. Winding 7 has a series of voltage varying taps 9. The output of this winding is connected across an inductance 10 and a capacitance 11 which are respectively connected in series at 12 to form what is commonly called a monocyclic circuit for obtaining a voltage with a 90° phase shift with respect to an input voltage. The voltage available between transformer midtap connection 8 and the common connection 12 between reactor 10 and capacitor 11 is shifted 90° with respect to the voltage induced in secondary windings 6 and 7. The transformer midtap connection 8 completes a connection between the transformer secondary winding 6, the output of which shall be called the "A" phase, and the voltage appearing between interconnection 8 and point 12 which shall be called the "B" phase. The A and B phases of the two-phase system, when connected as shown, produce three-phase voltages at the terminals 13 and 14 of winding 6 and point 12. Point 12 and terminals 13 and 14 are connected, as shown, to gaseous discharge rectifier units 15 and 16, which are preferably of the type employing an ionizable medium such as a gas or a vapor and each includes an anode, a cathode of the self-reconstructing type, such as a mercury pool cathode, and a conduction initiating member of the immersion-ignitor type having an extremity extending into the mercury and constructed of a material such as boron carbide or silicon carbide having an electrical resistivity relatively large compared with that of the associated mercury. The anodes of units 15 are respectively connected to 12, 13, and 14 and the cathodes of these units are all connected to positive bus 17 of the direct current load circuit. The cathodes of units 16 are respectively connected to 12, 13, and 14 and the plates are all connected to the negative bus 18 of the direct current load circuit. The units 15 and units 16 are, therefore, connected in series and any instantaneous load current must pass through one or more of the units 15 and one or more of the units 16. This six-unit rectifier circuit may be referred to as a six-phase, two-way rectifier circuit and it is known that this circuit results in a rectified direct current having six pulses or "ripples" per cycle which represents a relatively smooth direct current. The advantages of this particular rectifier circuit configuration are obvious since no transformers are required and, yet, an effectively six-phase rectifier output is obtained. Suitable excitation circuits for the rectifier units are to be provided, but these may be of conventional design or of known design such as is shown in Patent 2,362,294, granted November 7, 1944, to Albert H. Mittag and assigned to the same assignee as this application. For the sake of simplicity, these excitation circuits are not shown here.

The load circuit between buses 17 and 18 includes direct current driving motors 19 with armatures connected in series, each with a series connected excitation winding 20. In parallel with each winding 20 there may be connected a resistance 21 which serves as a by-pass circuit around the winding for the alternating current "ripples" which appear in the output from rectifiers 15 and 16. By this means, the "ripple" currents causing eddy currents in the field cores of drive motors 19, and the resulting heating therein, are reduced.

It is generally contemplated that a separate drive motor will usually be employed for each drive wheel in a locomotive employing the power system of this invention. It is obvious then that more than two drive motors will generally be used, and, therefore, additional pairs of drive motors corresponding to motors 19, with their associated series windings, will be connected between load buses 17 and 18.

For further details of the invention, reference should be made to Fig. 2. In Fig. 1, the transformer secondary windings 6 and 7 are shown as associated with a single transformer primary winding 5 in a transformer apparatus indicated generally as 22. This simplified showing of the transformer apparatus was made for a quicker and easier understanding of the remainder of the locomotive power system of this invention.

In the schematic diagram of Fig. 2, the transformer system 22 is shown in more detail together with the remainder of the locomotive power system shown in Fig. 1 and described in connection therewith. Power is supplied from the trolley 3 through a filter system including inductances 23 and 24 and capacitance 25. This filter is for the purpose of preventing undesired transient voltages, which may be generated in the locomotive power system, from being conveyed back into the trolley conductor 4 to adversely affect the trolley power supply apparatus.

Transformer secondary windings 6 and 7, shown in the simplified diagram of Fig. 1 as coupled with a single primary winding 5, are separate portions of two separate transformers, secondary winding 6 being coupled with a primary winding 26 and secondary winding 7 being coupled with a primary winding 27. Transformer primary winding 27 is provided with a series of taps 28, and a controller 29 is provided whereby the locomotive operator can change the connection to these taps by a movable controller contact 30 whereby a voltage of variable magnitude may be applied from this contact through a connection 31 to transformer primary winding 26 to thereby vary the voltage of phase A. A second movable contact 32 on controller 29 is adapted to change the connection from the variable voltage taps 9 on winding 7 through a conductor 33 to capacitor 11. As the controller contacts are advanced upwardly from the lowermost position, which is shown dotted on the diagram, contact is successively alternately made between movable contact 30 and 32 and the successively higher taps adapted to cooperate therewith. As the movable contact 32 leaves the uppermost of taps 9, it connects with an extended contact bar 34 which, in turn, is connected at 35 to the movable contact 36 of a stepping relay 37.

Switch 37 controls the connection of variable voltage taps 9 to automatically control the current of the B phase to equal, as nearly as possible, the current of the A phase. This is accomplished with the assistance of a current-balancing relay 38, comprising a solenoid 39 connected to carry the A phase output current of conductor 13, and solenoid 40 connected to carry the B phase current of conductor 8 interconnecting the midtaps of windings 6 and 7. A current excess in phase B will result in a relative strengthening of the pull of solenoid 40, causing the balancing relay 38 to tilt to the left and closing the contact at 41. An unbalance in the opposite direction would cause closing of contact 42. Stepping relay 37 includes actuating solenoids 43 and 44 which are respectively energized by closing of contacts 41 and 42. These solenoids, by operating upon notched wheels 45, cause the movable contact 36 to move one step in the required direction. By this means, the A and B phase currents are automatically substantially equalized after the initial acceleration period where the changes of connection to taps 9 are accomplished manually as part of the accelerating tap changing cycle. The locomotive will then have attained higher speeds corresponding to higher voltages, the starting inrush current having subsided. This A and B phase current equalization assures a substantially symmetrical operation of the apparatus, with a "ripple" voltage at the direct current driving motor load which is within permissible limits. The equalization is aided by virtue of a unique feature of the monocyclic circuit. This feature, characteristic of all monocyclic circuits, is that for a given voltage input, there is invariably a given current output. The current output from the B phase is, therefore, completely controllable by the input voltage supplied from winding 7, depending upon which of taps 9 is connected, this, independent of the speed of the locomotive and the resultant back E. M. F. generated by the drive motors 19.

It will be seen from the above description that the locomotive power system described is a simple, practical, economical system whereby an input source of power of only single phase alternating current may be used to derive a direct current for direct current drive motors which is of a smooth and "ripple-less" nature generally expected only from an elaborate six-phase rectifier system. In addition, the invention provides a simple practical speed control whereby a variable speed control voltage is obtained with no transformer equipment in addition to that required for other circuit functions. In this connection, it should be recognized that the number of separate steps in the accelerating cycle is equal to the number of taps 28 on winding 27 plus the number of taps 9 on winding 7. It is contemplated that there may be as many as six of the taps 9 on winding 7 and as many as twenty-six of the taps 28 on winding 27 to give thirty-two acceleration control steps. Fewer taps 9 and 28 are shown for greater simplicity and clarity in the diagram.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of this invention.

What we claim as new and desire to secure by Letters Patent of the United States is:

1. In a locomotive power system for utilizing single phase alternating current, a current collector for transmitting the current from a trolley wire to the locomotive, a first transformer primary winding connected in circuit between said current collector and ground, a locomotive speed controller having first and second movable tap changing contacts, said first transformer primary winding having a series of taps adapted to be contacted by said first contact, a second transformer primary winding connected between said first contact and ground, a secondary winding on said second transformer for supplying the A phase of a two-phase circuit, a monocyclic circuit comprising a capacitor, a reactor, and a secondary winding on said first transformer connected in a closed loop for supplying the B phase of said two-phase circuit, a series of taps on said first transformer secondary winding adapted to be contacted by said second controller contacts for changing the current and voltage of said B phase during the initial accelerating period of said locomotive, automatic tap changing apparatus connected to said second contact after the initial acceleration period of said locomotive to control the tap connections at said first transformer secondary winding to balance said B phase current to said A phase current, a connection between the midpoints of said first transformer and said second transformer secondary windings to establish a connection between said A phase and said B phase to obtain a three-phase output voltage therefrom, three-phase output conductors extending from the terminal ends of said second transformer secondary winding and the common connection between said capacitor and said reactor, a rectifier system including a pair of oppositely poled rectifier elements connected to each of said three-phase conductors, the output terminals of one element of each pair being interconnected to comprise one conductor of a direct current load circuit and the output terminals of the other element of each pair being interconnected to comprise the other conductor of said direct current load circuit, locomotive drive motors connected between said load circuit conductors.

2. In a locomotive power system for utilizing single phase alternating current, a current collector for transmitting the current from a trolley wire to the locomotive, a filter circuit connected between said current collector and ground to prevent transmission of unsymmetrical voltages from said locomotive power system into said trolley wire, a first transformer primary winding connected between said filter and ground, a manually movable locomotive speed controller having first and second movable tap changing contacts, said first transformer primary winding having a series of taps adapted to be contacted by said first contact, a second transformer primary winding connected between said first contact and ground, a secondary winding on said second transformer for supplying the A phase of a two-phase circuit, a monocyclic circuit comprising a capacitor, a reactor, and a secondary winding on said first transformer connected in a closed loop for supplying the B phase of said two-phase circuit, a series of taps on said first transformer secondary winding adapted to be contacted by said second controller contact for changing the current and voltage of said B phase during the initial accelerating period of said locomotive, automatic tap changing apparatus connected to said second contact after the initial acceleration period of said locomotive to control the tap connections at said first transformer secondary winding to balance said B phase current to said A phase current, a connection between the midpoints of said first transformer and said second transformer secondary windings to establish a connection between said A phase and said B phase to obtain a three-phase output voltage therefrom, three-phase output conductors extending from the terminal ends of said second transformer secondary winding and the common connection between said capacitor and said reactor, a rectifier system including a pair of oppositely poled rectifier elements connected to each of said three-phase conductors, the output terminals of one element of each pair being interconnected to comprise one conductor of a direct current load circuit and the output terminals of the other element of each pair being interconnected to comprise the other conductor of said direct current load circuit, at least two locomotive drive motors and series field windings for said drive motors connected in series in said load circuit, and a resistor connected in parallel with each of said series field windings to reduce current "ripples" therein.

ERNST F. W. ALEXANDERSON.
BURNICE D. BEDFORD.
ALBERT H. MITTAG.

REFERENCES CITED

The following references are of record in the file of this patent:

UNITED STATES PATENTS

| Number | Name | Date |
|---|---|---|
| 1,216,236 | Laycock | Feb. 13, 1917 |
| 1,308,094 | Meyer | July 1, 1919 |
| 1,843,521 | Smith | Feb. 2, 1932 |